(12) United States Patent
Lewin et al.

(10) Patent No.: US 7,010,578 B1
(45) Date of Patent: Mar. 7, 2006

(54) INTERNET CONTENT DELIVERY SERVICE WITH THIRD PARTY CACHE INTERFACE SUPPORT

(75) Inventors: Daniel M. Lewin, Cambridge, MA (US); Bruce Maggs, Pittsburgh, PA (US); John Josef Kloninger, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 364 days.

(21) Appl. No.: 09/666,171

(22) Filed: Sep. 21, 2000

(51) Int. Cl.
*G06F 15/167* (2006.01)
(52) U.S. Cl. .................... 709/217; 711/122
(58) Field of Classification Search ............ 711/122, 711/152; 705/1, 14; 709/224, 229, 223, 709/217; 707/10
See application file for complete search history.

(56) References Cited

U.S. PATENT DOCUMENTS

| | | | |
|---|---|---|---|
| 5,991,809 A | 11/1999 | Kriegsman | |
| 6,003,030 A | 12/1999 | Kenner et al. | |
| 6,108,703 A | 8/2000 | Leighton et al. | |
| 6,119,143 A | 9/2000 | Dias et al. | |
| 6,185,598 B1 | 2/2001 | Farber et al. | |
| 6,286,084 B1 * | 9/2001 | Wexler et al. | 711/152 |
| 6,343,323 B1 * | 1/2002 | Kalpio et al. | 709/229 |
| 6,405,252 B1 | 6/2002 | Gupta et al. | |
| 6,484,143 B1 * | 11/2002 | Swildens et al. | 705/1 |
| 6,487,538 B1 * | 11/2002 | Gupta et al. | 705/14 |
| 6,502,125 B1 | 12/2002 | Kenner et al. | |
| 6,532,493 B1 * | 3/2003 | Aviani et al. | 709/224 |
| 6,542,964 B1 * | 4/2003 | Scharber | 711/122 |
| 6,553,413 B1 | 4/2003 | Leighton et al. | |
| 6,591,266 B1 * | 7/2003 | Li et al. | 707/10 |
| 6,665,706 B1 | 12/2003 | Kenner et al. | |
| 6,704,781 B1 * | 3/2004 | Einarson et al. | 709/223 |

* cited by examiner

*Primary Examiner*—Wen-Tai Lin
*Assistant Examiner*—Jungwon Chang
(74) *Attorney, Agent, or Firm*—David H. Judson

(57) ABSTRACT

Third party cache appliances are configured into a content delivery service to enable such devices to cache and serve content that has been tagged for delivery by the service. The invention enables the content delivery service to extend the reach of its network while taking advantage of high performance, off-the-shelf cache appliances. If the third party caches comprise part of a third party content delivery network, the interconnection of caches to the CDS according to the present invention enables the CDS and the third party network to share responsibility for delivering the content. To facilitate such "content peering," the CDS may also include a traffic analysis mechanism to provide the third party network with preferably real-time data identifying the content delivered by the CDS from the third party caches. The CDS may also include a logging mechanism to generate appropriate billing and reporting of the third party content that is delivered from the cache appliances that have been joined into the CDS.

5 Claims, 4 Drawing Sheets

INTERNET CONTENT DELIVERY SERVICE WITH THIRD PARTY CACHE INTERFACE SUPPORT

This application contains subject matter protected by copyright. All rights reserved.

BACKGROUND OF THE INVENTION

1. Technical Field

The present invention relates generally to high-performance, fault-tolerant web content delivery.

2. Description of the Related Art

It is known in the prior art to distribute media-rich web objects away from busy home sites to a network of content servers located across multiple major Internet backbone networks. One such content delivery service (CDS) is known as FreeFlow, which is available from Akamai Technologies, Inc. of Cambridge, Mass. Akamai operates a global content delivery network (CDN) comprising a large number of distributed content servers, network mapping servers, and associated mechanisms to track reporting and administration of its content delivery service. The Akamai content servers are typically located at edge-of-network access points such as Internet Points-of-Presence (POPs).

In operation of the FreeFlow CDS, a software tool is used to tag embedded web page objects, such as graphics and images, for delivery via the CDN. Typically, the objects are tagged by transforming web page Uniform Resource Locators (URLs) that identify those objects. The objects identified by the modified URLs are then hosted on the CDN content servers. In a typical user interaction with a FreeFlow-enabled web site, the user's browser sends a request for a web page to the site. In response, the web site returns the page markup language (e.g., HTML) code as usual, except that the embedded object URLs have been modified to point to the content delivery service. As a result, the browser next requests and tries to obtain the media-rich embedded objects from an optimally-located delivery service server, instead of from the content provider's site. The above-described web content delivery service provides significant advantages, namely, faster downloads for end-users, reduced load on the home site, flash crowd protection, easier web site management and infrastructure scaling, and the ability to distribute media-rich objects effectively.

There are a number of third party vendors of HTTP caches. These caches would be quite useful in a content delivery service as they can cache and serve content that has been tagged for delivery by the CDS. While it would be desirable to enable third party caches to become content servers in the CDN, complications arise because the CDS does not have a priori knowledge of the locations and configurations of these machines, nor does it have administrative access to them at runtime. Thus, it has not been possible to enable third party caches to readily "join" a CDN. The present invention addresses this need in the content delivery art.

BRIEF SUMMARY OF THE INVENTION

Third party cache appliances are configured into a content delivery service to enable such devices to cache and serve content that has been tagged for delivery by the service. The invention enables the content delivery service to extend the reach of its network while taking advantage of high performance, off-the-shelf cache appliances. If the third party caches comprise part of a third party content delivery network, the interconnection of caches to the CDS according to the present invention enables the third party network to assume some given responsibility for delivering the content. To facilitate such "content peering," the CDS may also include a traffic analysis mechanism to provide the third party network with preferably real-time data identifying the content delivered by the CDS from the third party caches. The CDS may also include a logging mechanism to generate appropriate billing and reporting of the third party content that is delivered from the third party cache appliances that have been joined into the content delivery network according to the invention.

The foregoing has outlined some of the more pertinent objects and features of the present invention. These objects should be construed to be merely illustrative of some of the more prominent features and applications of the invention. Many other beneficial results can be attained by applying the disclosed invention in a different manner or by modifying the invention as will be described. Accordingly, other objects and a fuller understanding of the invention may be had by referring to the following Detailed Description of the Preferred Embodiment.

DETAILED DESCRIPTION OF THE PREFERRED EMBODIMENT

Figure 1:
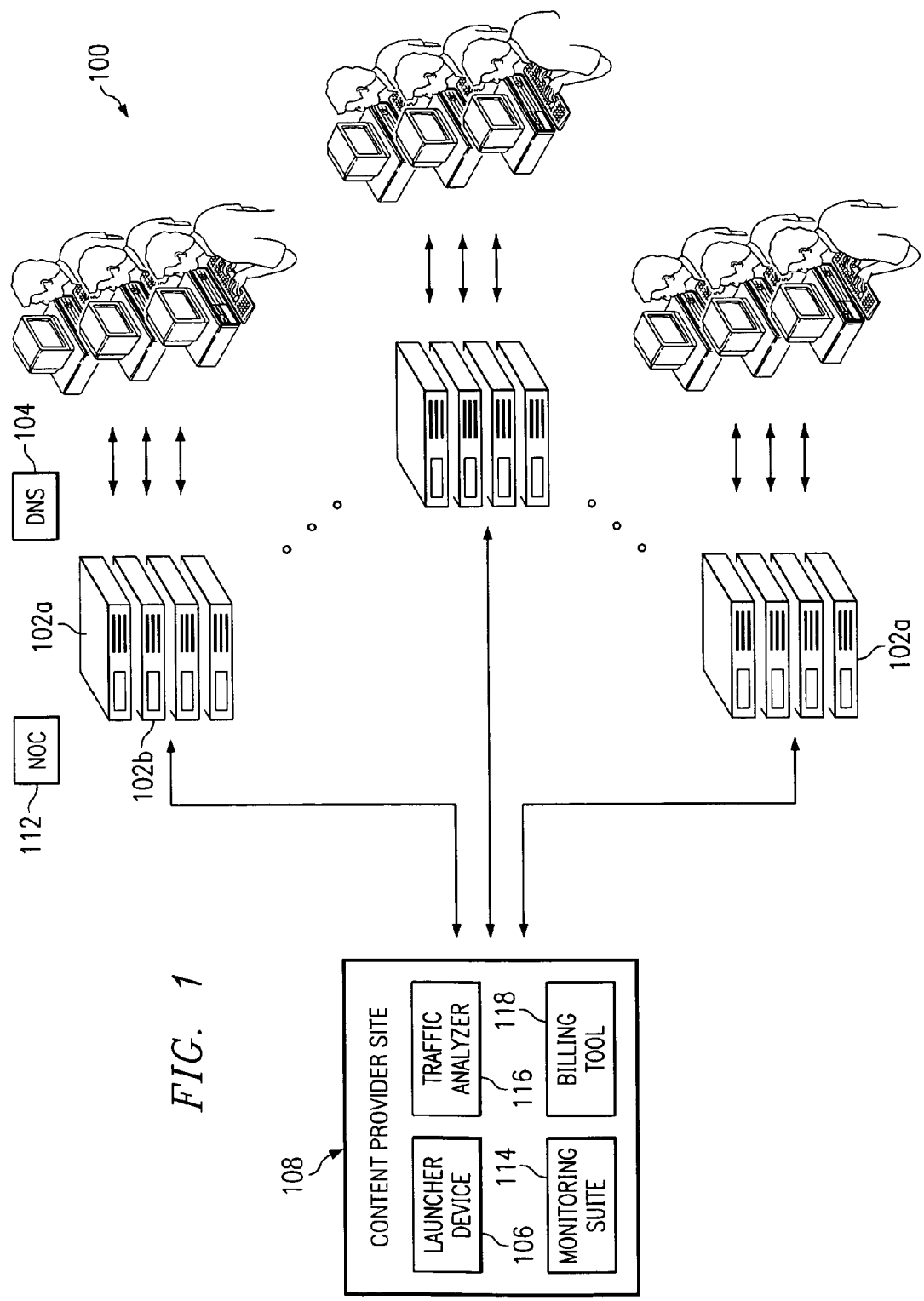
FIG. 1 is a block diagram of a content delivery service in which the present invention may be implemented.

FIG. 1 is a diagram illustrating an illustrative content delivery service in which the present invention may be implemented. The inventive may likewise be implemented with other known content delivery services or systems. In the illustrative embodiment, the content delivery service (CDS) comprises a preferably global content delivery network (CDN) 100 of content delivery servers 102*a–n*, a dynamic domain name service (DNS) system 104, and a tool 106 that allows content to be tagged for inclusion on the network. Generally, the content delivery service allows the network of content delivery servers 102*a–n* to serve a large number of clients efficiently. Although not meant to be limiting, a typical server (such as content server 102) is a Pentium-based caching appliance running the Linux operating system with about 1 GB RAM and between about 40–80 GB of disk storage. As also seen in FIG. 1, the content delivery service may include a network operations center (NOC) 112 for monitoring the network to ensure that key processes are running, systems have not exceeded capacity, and that sets of content servers (so-called regions) are interacting properly. A content provider may also have access to a monitoring suite 114 that includes tools for both real-time and historic analysis of customer data. One tool is a traffic analyzer 116 that provides multiple monitoring views that enable quick access to network and customer-specific traffic information. A reporter 118 allows for viewing of historical data. A billing tool 118 may be used to generate appropriate billing information for the content provider, who typically pays for the service as a function of the amount of content delivered by the CDN.

Figure 2:
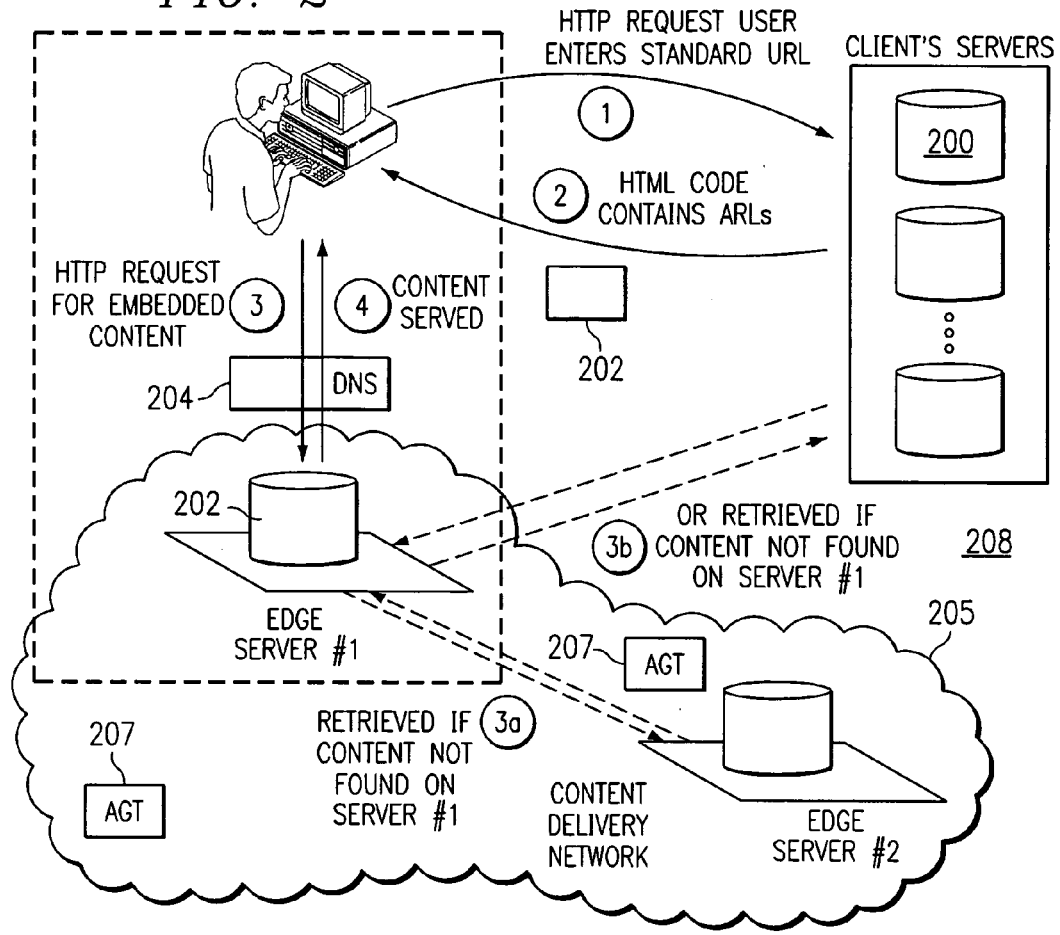
FIG. 2 is a simplified diagram illustrating how a content provider site operates with the content delivery service.

High-performance content delivery is provided by directing requests for media-rich web objects to the content delivery service network. In one known technique, known as Akamai FreeFlow content delivery, content is first tagged for delivery by the tool 106, which, for example, may be executed by a content provider at the content provider's web site 108. The tool 106 converts web page URLs to modified resource locators, called ARLs for convenience. FIG. 2 illustrates how the web site 208 operates after given embedded objects in a web page have been modified with ARLs. As illustrated, the content provider's web servers 200 preferably still serve the basic or "base" HTML page 202, although this is not a requirement. However, the URLs of the embedded objects within that page have been modified (into ARLs) and no longer resolve to the content provider's site in the first instance, but rather to the content delivery service network 205.

According to the present invention, third party caches are added to the content delivery service's CDN to cache and deliver content. As used herein, a "third party" cache refers to a machine deployed by an entity (e.g., a network such as an ISP, a corporate intranet, an internetwork provider, or the like) other than the content delivery service itself. Typically, the third party cache is a box purchased or otherwise obtained from a cache vendor (e.g., CacheFlow, Cisco, InfoLibria, NetApp, Inktomi, or the like) and deployed in the owner's network. The cache may also comprise part of a third party content delivery network. When third party caches are joined into the content delivery service according to the invention, content may be shared across the resulting composite network. This sharing of content is sometimes referred to herein as "content sharing" or "content peering." Thus, according to the invention, at least one third party appliance is joined into the content delivery service's CDN as a cache to facilitate caching and delivery of content from that cache.

Figure 3:
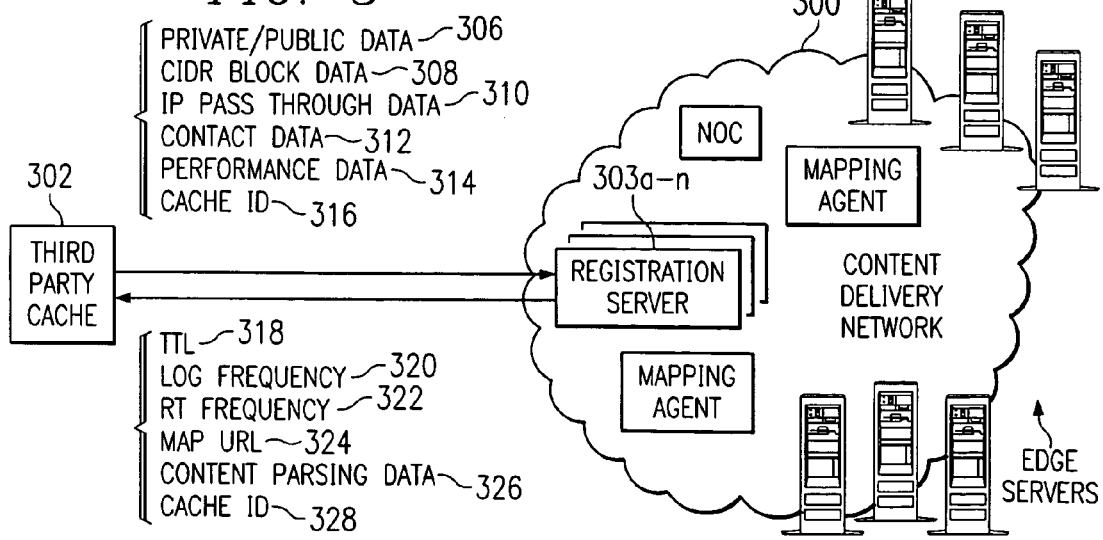
FIG. 3 is a simplified representation of how a third party cache is registered to join the CDN according to the present invention.
Figure 4:
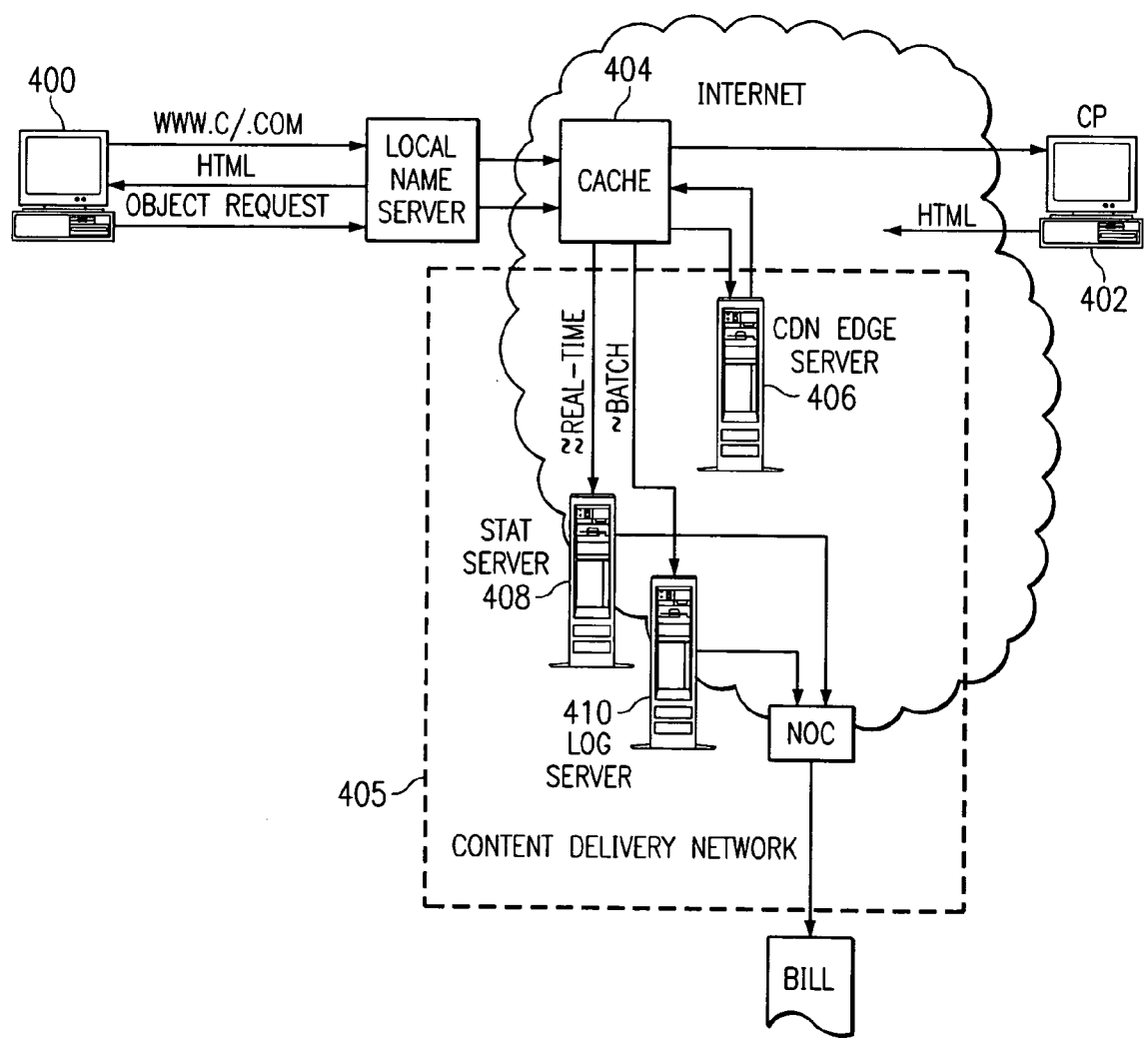
FIG. 4 illustrates how the third party cache functions as a transparent cache within the CDN following the registration process.

Although not always required, typically a third party cache is first "registered" with the content delivery network. Thereafter, the third party cache may be used to cache and deliver content. Registration (or all the aspects thereof) may not be required, for example, if the CDN and third party vendor preconfigure the cache (or some operational aspects thereof) in advance so that it can join the CDN. FIG. 3 is a simplified representation of the cache registration process, and FIG. 4 represents how the third party cache is then used as an authoritative surrogate content server, just like any other CDN content server. In FIG. 3, third party cache 302 registers with the content delivery network 300, providing the CDN with information about how it will participate in the network (or not). The content delivery network may include one or more dedicated registration servers 303a–n for this purpose. A registration server may be a Pentium-based machine running the Linux operating system and Apache web server software. Preferably, the cache will function in a "push" only mode wherein it can push to the CDN reports, requests, or the like. Typically, the CDN 300 does not poll the third party cache 302, and a firewall may prevent the CDN from initiating external connections. Moreover, typically the CDN will not be able to log into the cache in any way (e.g., by telnet, ssh, or the like) and, once deployed, the third party cache may or may not receive software upgrades. Thus, except possibly at configuration, the CDN may not be able to change any particular functionality of the third party cache. Preferably, the owner and administrator of the cache may tune given parameters, e.g., how frequently to send the CDN real-time statistics. Preferably, the CDN establishes default values and minimum/maximum values for such parameters.

The registration process preferably takes into consideration that there are many different ways that a cache may be deployed. In particular, a cache may be deployed behind a firewall, so that no incoming connections can be made to the cache. A cache thus may have a "public" status or a "private" status. A public machine may live outside a corporate firewall and thus can serve general purpose traffic. Effectively, a third party cache that is a public server can become a content server for the CDN. Private machines, on the contrary, are intended to be accessed only from within a given enterprise (whether or not behind a firewall). A given cache may also have CIDR block restrictions, which means that the cache may be provisioned to only get traffic from blocks of IP addresses that they "own." In addition, a cache may be provisioned to not report the IP address of a requestor in a cache log out of privacy concerns. The registration process of the invention preferably provides sufficient flexibility to manage any of these deployment options.

Thus, upon registration, the third party cache provides the CDN given information as indicated in FIG. 3. Preferably, a registration server 303a–n is used for this purpose. The registration server may be a Pentium-based box running the Linux operating system and Apache web server software. The information provided by the cache may include data 306 identifying the machine as public or private. In addition, the cache may provide the CDN service restriction data 308, which is a list of CIDR blocks that it (as a public machine) is willing to serve. If the cache restricts traffic, then the CDN must respect such restrictions. In addition, the cache preferably also provides the CDN block/pass through IP data 310. In particular, a blocking cache will not report its own IP address to the CDN or any of its clients' IP addresses. Upon registration, the cache may also provide the CDN with contact data 312, e.g., name, phone number, and email, of the technical contact responsible for the cache. In addition, the cache preferably provides the CDN performance characteristic data 314. A flexible protocol may be used for this purpose so that the CDN can ask the cache dynamically to provide performance and health statistics, and the cache can reply with the statistics it can provide. Additionally, if the cache can provide a metric, preferably it informs the CDN of the bounds of that metric during the registration process. For example, if the cache reports bits/second outgoing and its maximum link capacity, then the CDN may use this information later to estimate how close the cache is to its limits. Finally, the cache may provide the CDN a cache identifier 316 to facilitate initial registration or a renewal of a registration.

The CDN preferably provides cache 302 with given information during the registration process. As also illustrated in FIG. 3, preferably the CDN provides the cache with a time-to-live (TTL) indication 318, which controls how long the registration is valid. Following expiration of the TTL, the cache may need to re-register to keep itself current. In addition, the CDN preferably provides the cache given configuration information including log recipient and frequency 320, RT (real-time) statistics recipient and frequency data 322, a map URL 324, and content parsing information 326. The log recipient and frequency data 320 identifies the frequency (e.g., every 4 hours) that logs will be transmitted from the cache to the CDN. The RT statistics recipient and frequency data 322 is preferably a function of both time and number of hits. If the cache has not seen a requisite number of hits in a period, then it need not send an RT update and may continue to aggregate hits until a next update period (e.g., every 30 seconds). The map URL 324 identifies a location of a network map within the CDN. Once the cache is configured into the CDN, it becomes a server in the CDN network map and, as such, may assume responsibility (i.e., become "authoritative") for delivering content. The map's default TTL is preferably long (e.g., one month). The content parsing data 326 is the information needed to identify CDN-provisioned content and to fetch it correctly as will be described below. Generally, this information includes a list of CDN-specific domain names, and a set of regular expressions (e.g., typecode, content provider code, a serial number code, or the like) for parsing CDN-specific embedded object URLs for tracking usage statistics. In addition, the CDN preferably also provides the cache a generic format that can be used by the cache to construct a CDN-specific host name, e.g., based on the typecode, content provider code, serial number code, or the like. In particular, and as described below, in order to fetch content from the CDN, the cache constructs a CDN-specific host name. During registration, the CDN thus provides the cache with the appropriate template for constructing this host-name. Finally, the CDN may provide a cache identifier (ID) 328 if this is not a renewal registration.

The CDN preferably provides the CDN with given information during the registration process. As also illustrated in FIG. 3, preferably the CDN provides the cache with a time-to-live (TTL) indication 318, which controls how long the registration is valid. Following expiration of the TTL, the cache may need to re-register to keep itself current. In addition, the CDN preferably provides the cache given configuration information including log recipient and frequency 320, RT (real-time) statistics recipient and frequency data 322, a map URL 324, and content parsing information 326. The log recipient and frequency data 320 identifies the frequency (e.g., every 4 hours) that logs will be transmitted from the cache to the CDN. The RT statistics recipient and frequency data 322 is preferably a function of both time and number of hits. If the cache has not seen a requisite number of hits in a period, then it need not send an RT update and may continue to aggregate hits until a next update period (e.g., every 30 seconds). The map URL 324 identifies a location of a network map within the CDN. Once the cache is configured into the CDN, it becomes a server in the CDN network map and, as such, may assume responsibility (i.e., become "authoritative") for delivering content. The map's default TTL is preferably long (e.g., one month). The content parsing data 326 is the information needed to identify CDN-provisioned content and to fetch it correctly as will be described below. Generally, this information includes a list of CDN-specific domain names, and a set of regular expressions (e.g., typecode, content provider code, a serial number code, or the like) for parsing CDN-specific embedded object URLs for tracking usage statistics. In addition, the CDN preferably also provides the cache a generic format that can be used by the cache to construct a CDN-specific host name, e.g., based on the typecode, content provider code, serial number code, or the like. In particular, and as described below, in order to fetch content from the CDN, the cache constructs a CDN-specific host name. During registration, the CDN thus provides the cache with the appropriate template for constructing this host-name. Finally, the CDN may provide a cache identifier (ID) 328 if this is not a renewal registration.

Upon registration, the cache is considered functional. If it is a public machine and its IP address is known (i.e., non-blocked), then the CDN can modify its network map to route traffic to the new cache, respecting the cache's CIDR block restrictions as necessary.

As illustrated in FIG. 4, when an end user at a client machine 400 makes a request for given page content, typically the HTML for the page is served from the content provider origin server 402, although this is not required as has been described. The request may or may not pass through the third party cache 404 that has been configured into the CDN as described above. This HTML preferably has been modified to include modified URLs (so-called alternate resource locators) that point to the CDN. For more details of this process, reference should be made to U.S. Pat. No. 6,108,703, which is incorporated herein by reference. The HTML is then returned to the user's browser. When the browser then attempts to resolve the alternate resource locators (ARLs) that point to the CDN, the third party cache 404, which is operating in a transparent mode, recognizes those URLs as being CDN-specific. If the requested object is not present in the third party cache 404, the cache preferably goes out to the CDN 405 (e.g., CDN edge server 406) to retrieve the object. Thus, according to the invention, preferably the third party cache must recognize when it gets a request for CDN-specific content (e.g., content that has been identified by a modified URL or by some other technique, e.g., domain name delegation or via a DNS alias) that it does not already have, and then it must go get the content. Typically, the third party cache will not explicitly understand how to parse the CDN-specific modified URL (e.g., an Akamai ARL) and other codes that the CDN may include in the modified URL, however, the cache still can determine when the requested content has been modified to be served from the CDN and, according to the invention, the cache includes appropriate intelligence so that it can get that content from the CDN. The preferred technique for accomplishing this content fetching is now described.

Figure 5:
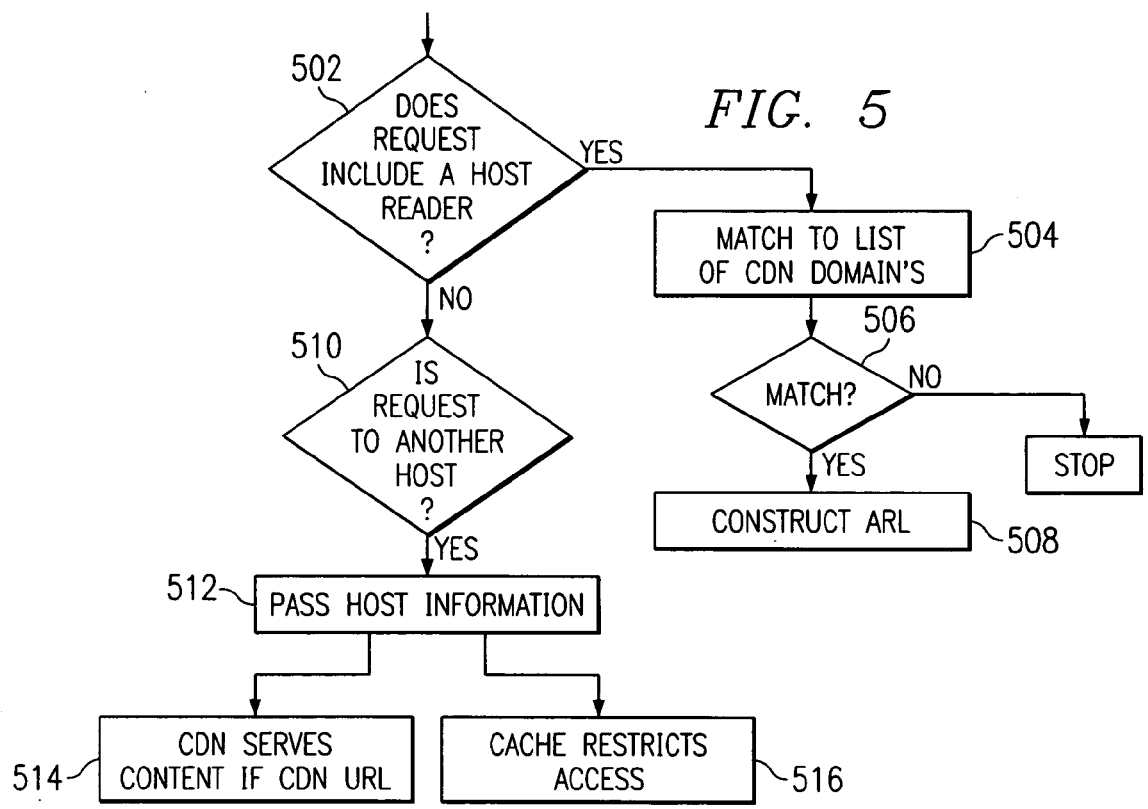
FIG. 5 is a simplified flowchart that illustrates how a third party cache operates within the CDN.

Conventionally, when a cache gets a request for content it does not have already, it goes back to the source. For CDN-specific content, however, the third party cache that has been provisioned into the CDN according to the present invention goes back to the CDN (not necessarily the content provider origin server) to fill the request. To this end, the third party cache typically must distinguish a normal URL from a URL that has been modified to be resolved by the CDN (e.g., an Akamai ARL). There are several possible scenarios in this regard as illustrated in the high level flow diagram of FIG. 5. First, if the client browser is compatible with HTTP 1.1, the HTTP request may include a HOST header. Thus, a test is performed at step 502 to determine if the request includes a HOST header. If so, the cache tries to match the host provided (in the header) against the known list of CDN domains that were provided by the CDN during the registration process. This is step 504. If there is a match as established by the test at step 506, then the cache constructs an ARL in step 508 as will be described below. If no host header is present (e.g., because the browser is not HTTP 1.1 compliant), a test is performed at step 510 to determine if the request is to another host. If so, then the cache may pass that host information along as normal. This is step 512. If the request is for a CDN-specific modified URL, then the CDN will serve up the content correctly once the request has been passed by the cache. This is step 514.

If, however, the request is directly to the cache itself, then additional handling is typically performed to prevent third party caches from attempting to get content from each other, which is undesirable. This is step 516. Preferably, a third party cache parses the request and creates an ARL to get content from the CDN, not from another third party cache.

Figure 6:
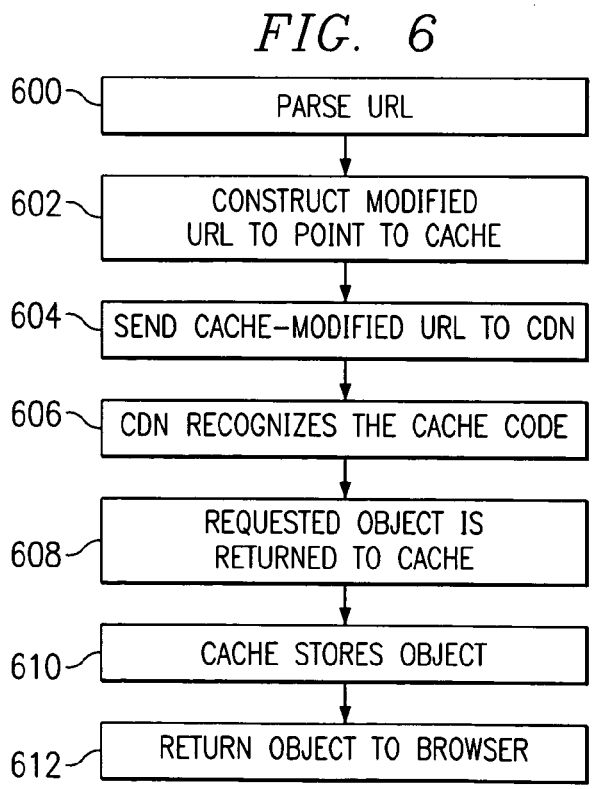
FIG. 6 is a simplified flowchart illustrating how the cache obtains content from the CDN.

FIG. 6 illustrates how the cache obtains content from the CDN. This was step 508 above. In particular, when necessary to get content from the CDN, the cache first performs minimal parsing of the modified URL and extracts given information, e.g., a serial number, using standard library functions. This is step 600. Before going directly to the CDN, the cache preferably constructs a name for a CDN host, so that the resulting URL may look similar to: aSERIAL.c.akamai.net:/TYPCODE/SERIAL/CP/ . . . , where TYPCODE is the typecode, SERIAL refers to the serial number, and CP refers to the content provider code obtained during the registration process. This is step 602. It is not required that all of these data fields be used, of course. At step 604, the cache-modified URL is sent to the CDN. At step 606, the CDN recognizes the "c" or other identifier (indicating that the request originates from a third party cache) and preferably steers the request to a closest CDN server (e.g., using conventional CDN intelligent routing). At step 608, the requested object is returned to the cache. The cache stores the object at step 610 and then returns it to the requesting client browser at step 612 to complete the process.

As described in U.S. Pat. No. 6,108,703, the serial number may identify a virtual content bucket in a set of content servers within the CDN in which the requested object is expected to be found. Thus, when the serial number is used by the cache to generate a URL as described above, the identity of the closest server is identified and derived from the information passed to the third party cache during the registration process.

A regular expression match is not a guarantee that the cache has found a CDN-specific modified URL, because other URLs could match the CDN's format. Upon a match, however, the cache may then parse out the serial number and use it to generate a new host name in the new modified URL. Using the new modified URL, the cache can then attempt to get the content; it if fails, then it can fall back and use the original URL to attempt to fetch the content.

When the cache sends its request to the CDN, it may change a User-Agent: host header to signal to the CDN that is should be able to cache the results. The third party cache (namely, the User-Agent) should then include its CDN identifier that was provided during registration. The CDN server that responds to the request may then change the headers that are sent back to the cache to reflect the correct caching semantics based on the type of content requested. This prevents the cache from having to understand the meanings of the various CDN content type codes.

Preferably, the CDN allocates sufficient resources (e.g., servers) to facilitate use of the third party caches by the CDN. Thus, for example, the CDN may provision a given low level DNS server to manage content requests originating from a set of third party caches that, together, form a content delivery region within the context of the CDN. The set of third party caches need not, however, be located in the same geographic location even when they are managed as a "region" within the CDN.

As described above, during normal operation, the third party cache preferably sends the CDN NOC real-time statistics as well as log files. A more lightweight architecture may be implemented if real-time statistics are not required. When those statistics are provided, they are usually delivered to the CDN frequently, e.g., every 10 seconds by default, although preferably this value is configurable up to a maximum value. As illustrated in FIG. 4, the CDN preferably includes a real-time statistics server 408, such as a Pentium-based machine running the Linux operating system and Apache web server, for accepting the data, preferably via HTTP or some other convenient transport mechanism. Preferably, the data sent from the cache to the CDN statistics server 408 comprises the following (averaged as appropriate) over the real-time reporting period:

1. Health. Statistics reflecting the performance of the machine so we make load balancing decisions.
2. Usage. These give the CDN ongoing usage statistics (e.g., such as bytes and hits served), which are useful for accurate billing and system monitoring.

Periodically, for billing purposes, the cache preferably provides the CDN a dump of the complete logs for the content served by the cache. Alternatively, the cache may send just the log entries for CDN-specific content as can be identified by the matching rules described previously. As illustrated in FIG. 4, a log server 410 may be used for this purpose. The log server 410 may be a Pentium-based box running the Linux operating system and Apache web server software. Preferably, this dump is sent securely (e.g., via https) and in a compressed format, together with the cache identifier. Upon receipt, the CDN may provide the cache an HTTP "200 OK" message or the like. The cache may then flush these log entries. If the transmission could not begin, or was interrupted, then the cache may retry.

One of ordinary skill in the art will appreciate that integration of third party cache appliances into a CDN according to the present invention facilitates network content sharing arrangements, or so-called "content peering." In particular, it is assumed that a given third party cache that has been configured into the CDN is also part of a third party network used for transport, hosting and/or delivery of content provider content. The operator of the third party network may then make appropriate contractual or other arrangements with the CDN so that, in effect, the responsibility for delivering the content provider's content is shared by the CDN and the third party network whose cache appliances have been configured into the CDN according to the present invention. With appropriate content peering arrangements in place, the CDN may then provide the third parties (e.g., hosting providers, other content delivery networks, access and other network service providers, technology providers, and the like) appropriate services and share in revenues generated as a result. As an example, because the CDN has the capability of receiving cache logs, preferably in a secure manner, the CDN can function as a centralized billing and reporting mechanism for a set of third party service providers who, through the external cache interface mechanism of this invention, use the CDN for content delivery. In effect, the CDN then provides billing and payment services to compensate the third parties that participate in the content peering arrangements. As a particular example, the CDN may bill various content providers who use the CDN (together with the third party caches) and share the resulting revenues with those parties who have a content peering or other arrangement with the CDN. Generalizing, by enabling third party "edge-based" caches to be provisioned into a CDN, one or more third parties may "peer" with the CDN and each other to allow participants to share their networks and content delivery resources.

The following is a preferred detailed design of the external cache interface support mechanism of the present invention.

Registration Request and Response

Preferably, cache registration is done through a secure HTTP GET request to a CDN registration server. Several CDN servers may be provisioned to handle these requests. The first should be tried, and if it is unavailable, then the others in succession. During registration, the cache delivers to the CDN a list of metrics it can provide. Preferably, the cache supports a minimum list of statistics in order to participate in the CDN, for example:

time statistics requested, then the registration proceeds. In particular, the CDN registration server sends the new ID for the cache (or echoes the existing ID back in the case of a re-registration).

Details: Registration Request

Request Headers:
    GET/register http/1.1 [cr/1f]
    Host: register.[Vendor].akamai.com[cr/1f]
    Via: [Cache product name] [cr/1f]
    Content-type: application/octet-stream[cr/1f]
    Content-length: [number of bytes in request data] [cr/1f]

TABLE 1

Real-Time Statistics

| Statistic | Token | Required? | Description |
|---|---|---|---|
| | | | Health |
| Overall Health | hlth | Yes | A 0–100 scaled value indicating the cache's own determination of its health. This will be the primary metric used for load balancing. |
| Total Bytes/Sec | tbps | Yes | Aggregate data rate and HTTP requests served |
| Total Hits/Sec | thps | Yes | |
| CDN Bytes/Sec | abps | Yes | Data rate and HTTP requests for CDN content only |
| CDN Hits/Sec | ahps | Yes | |
| CIDR Bytes/Sec | cbps | No | Data rate and HTTP requests for each CIDR block served by the Cache |
| CIDR Hits/Sec | chps | No | |
| Total Packet Loss | tlos | No | Percentage of packets lost for entire Cache |
| CIDR Packet Loss | clos | No | Percentage of packets lost by CIDR block. |
| Total Packet Latency | tlat | Yes | Packet latency experienced for entire Cache, in seconds, averaged over the reporting period |
| CIDR Packet Latency | clat | No | Packet latency experienced, measured over each CIDR block, in seconds and averaged over the reporting period. |
| Open Connections | conn | No | Number of concurrent connections the Cache has had open, averaged over the reporting period |
| | | | Usage |
| CP Bytes/Sec | cpbs | Yes | Data rate and HTTP requests for CDN content, aggregated by content provider as parsed out of the modified URL. |
| CP Hits/Sec | cphs | Yes | |
| CIDR Bytes/Sec | cibs | Yes | Data rate and HTTP requests for CDN content, aggregated by CIDR network block as broken down by the Map provided. |
| CIDR Hits/Sec | cihs | Yes | |
| Serial Number Bytes/Sec | sebs | Yes | Data rate and HTTP requests for CDN content, aggregated by serial number as parsed out of the ARL. |
| | | Yes | |
| Serial Number Hits/Sec | sehs | Yes | |

If any of the metrics values change, then preferably the cache initiates a re-registration as soon as possible. Misinterpreting the statistics could cause unpredictable performance results. If the cache can provide the required real-

[cr/1f]
[binary data]
Registration request binary data content (all numbers in network order):

| Field | Description |
|---|---|
| unsigned int 1CDNID | Zero on the initial request. On subsequent re-registration requests this is the value provided by the CDN in the registration response (below). |
| byte cMajorVersion | Cache vendor's version number. |
| byte cMinorVersion | |
| byte cOpCode | Request op code |
| byte cFlags | Whether the Cache is public or private (P) and if the client IP's are going to be blocked (B). If P=0, CDN will not direct requests to the Cache (behind firewall). |

-continued

| Field | Description |
|---|---|
| byte cToken[64] | If B=0, IP addresses are to be passed through. If this value is 1, then all logs will contain 0.0.0.0 as the requesting IP address.<br>An encrypted version of the first 64 bits of data (1CDNID, cMajorVersion, cMinorVersion, cOpCode, and cFlags). It is preferably encrypted using a 512 bit (64 byte) private key. Authentication by the CDN is performed by decrypting this field using a public key provided by the Cache and comparing each values to those passed in the structure. If the comparison fails, the request is rejected. |
| byte cNumberCidrBlocksToServe<br>struct sCidrBlock {<br>unsigned int ip;<br>short mask;<br>}CidrBlocksToServe[]; | Allow the Cache system administrator to provide a list of IP blocks that will be served on the Cache. CidrBlocksToServe is an array with cNumberCidrBlocksToServe number of elements. If cNumberCidrBlocksToServe is 0, all IP addresses will be served and the array will not be there. |
| char AdminName[]<br>char AdminPhone[]<br>char AdminEMailAddress[] | Null-terminated character arrays with contact information in case of problem. |
| char RTLogFormat<br>char FullLogFormat | Strings containing list of tokens describing what the format of both the real-time statistics and full log reports will contain. The format should be used by the CDN to parse those fields later after initial validation during registration. |

Details: Registration Response http/1.1 [response code] [cr/1f]

Server: Akamai[cr/1f]

Content-type: application/octet-streamn[cr/1f]

Content-length: [number of bytes in response data] [cr/1f]

[cr/1f]

[binary data]

Request response binary data content (all numbers in network order):

| Field | Description |
|---|---|
| unsigned int 1CDNID | On an initial request the new ID assigned to the Cache by the CDN. On a re-registration the same ID as before is sent back. |
| long 1RegistrationTimeToLive | Number of seconds that this registration is valid. Upon expiration, Cache will re-register. The default value for this is seven days (604800 seconds). |
| byte cSecretServerID[] | The CDN authentication key for the real-time and full log reports. |
| long 1MapFrequency | The number of seconds between Map updates. |
| long 1FullLogFrequency | The number of seconds between full log updates. |
| long 1RTLogFrequency<br>long 1RTLogMaxHits | These two together specify the frequency that the real-time statistics will be reported. 1RTLogFrequency represents the number of seconds between reports unless 1RTLogMaxHits has not been achieved. If such is the case, the condensed log will be sent once 1RTLogMaxHits has been accumulated<./td> |
| char RequestFillURL[] | The domain name to use when the Cache makes requests to the CDN network (e.g. c.akamai.net. |
| char cFullLogURL[] | The URL to which the logs will be reported. It is a 0 terminated character array. |
| char cRTLogURL[] | The URL to which the condensed (real time) log will be reported. It is a null-terminated character array. |

-continued

| Field | Description |
| --- | --- |
| char cMapURL[] | The URL from which the Geographic/CIDR Map is to be retrieved. It is a null-terminated character array. |
| char ARLparseType[]<br>char ARLparseCP[]<br>char ARLparseSer[]<br>Three regular expressions for matching a URL modified by the CDN (e.g., an Akamai URL). An URL can be said to point to CDN content if, for example, it satisfies all three regular expressions. This need not be stringently enforced, however, if performance requirements merit using only one regular expression. Each one should be applied to pull apart the URL into its components parts (i.e. typecode, content provider code, and serial number) to generate a new ARL or for statistics gathering. | |
| char cCDNHostList[][] | The list of all CDN host names. The names may be wild-carded, i.e. *.g.akamai.net will represent all these host names regardless of the serial number. This field is an array of null-terminated character arrays. The final entry in the list will be double null-terminated. |

Details: De-Registration Request
    GET/deregester http/1.1 [cr/1f]
    Host: register.[Vendor].akamai.com[cr/1f]
    Via: [Cache product name] [cr/1f]
    Content-type: application/octet-stream[cr/1f]
    Content-length: [number of bytes in request data] [cr/1f]
    [cr/1f]
    [binary data]

De-registration request binary data content (all numbers in network order):

| Field | Description |
| --- | --- |
| unsigned int 1CDNID | The value provided by the CDN in the registration response. |
| byte cMajorVersion | The Cache vendor's version number. |
| byte cMinorVersion | |
| byte cOpCode | Op code |
| byte cFlags | null |
| byte cToken[64] | An encrypted version of the first 64 bits of data (1CDNID, cMajorVersion, cMinorVersion, cOpCode, and cFlags). It is encrypted using a 512 bit (64 byte) private key. Authentication by the CDN preferably is performed by decrypting this field using a public key provided by the Cache and comparing each values to those passed in the structure. If the comparison fails, the request is rejected. |

Details: De-Registration Response

The de-registration response will be made using the standard HTTPS Get response format. There is no need for attached data in the de-registration response.
    http/1.1 [response code] [cr/1f]
    Server: Akamai[cr/1f]

Real-Time Statistics Transmission

As noted above, preferably real-time health and usage statistics are sent by an HTTP GET request to a CDN server. Preferably, the CDN uses several servers that can respond to these transmissions for redundancy. Within the CDN, the server name may resolve to an Apache server for gathering cache statistics. It may or may not be the same server as the registration server.

Each statistic is uploaded preferably as a triple:
1. Token—The token from Table 1 above.
2. Specifier—The usage statistics aggregate over different parameters, which are reflected in this field. For example, when reporting bits/second data by serial number, this field is for the individual serial number.
3. Measure—A number representing the measurement in binary format Although not required, preferably the statistics themselves will be reported as a list of these triples, with the final entry signaled by a length zero token.

Detail: Real-Time Statistics Request
    GET/stats-upload http/1.1[cr/1f]
    Host: [RT stats server provided during registration] [cr/1f]
    Via: [Cache product name] [cr/1f]
    Content-type: application/octet-stream[cr/1f]
    Content-length: [number of bytes in request data] [cr/1f]
    [cr/1f]
    [binary data]

The real-time statistics upload request binary data format (all numbers in network order):

| Field | Description |
| --- | --- |
| unsigned int 1CDNID | The value provided by the CDN in the registration response. |
| byte cMajorVersion | The Cache vendor's version number. |
| byte cMinorVersion | |

-continued

| Field | Description |
|---|---|
| byte cOpCode | Op codes |
| byte cFlags | Null |
| long 1SerialN | The number passed in the previous upload response. |
| byte cMD5Hash[16] | Used by the CDN to authenticate the real-time log upload request. It may be a MD5 128-bit fingerprint of CDNID, cMajorVersion, cMinorVersion, cOpCode, cFlags, 1SerialN, and SecretServerID (received at registration). |
| byte RTData[] | The stream of statistics to be interpreted by the specification passed during registration in RTLogFormat. |

Detail: Real-Time Statistics Response
   http/1.1 [response code] [cr/1f]
   Server: Akamai[cr/1f]

| Field | Description |
|---|---|
| long 1SerialN | The number that Cache should include in the next registration request. This is essential to prevent replay attacks. |

Cache Log Transmission

Preferably, web logs are sent by a cache using an https GET to a given server identified by a CDN-specific domain. If required, log format conversions are done and then sent to a billing mechanism for processing, which may involve reconciliation and billing of multiple third parties that may be participating in content peering relationships with the CDN. The following format describes a structured list of the fields that may be included in a log upload. If more convenient, the log could be maintained in a flat ASCII file, and compressed and streamed into the request.

Detail: Log Transmission Request
   GET/log-upload http/1.1 [cr/1f]
   Host: [host provided during registration] [cr/1f]
   Via: [Cache product name] [cr/1f]
   Content-type: application/octet-stream[cr/1f]
   Content-length: [number of bytes in request data] [cr/1f]
   [cr/1f]
   [binary data]

Log transmission request binary data content (all numbers in network order):

| Field | Description |
|---|---|
| unsigned int 1CDNID | The value provided by the CDN in the registration response. |
| byte cMajorVersion | The Cache vendor's version number. |
| byte cMinorVersion | |
| byte cOpCode | Opcode |
| byte cFlags | Null |

-continued

| Field | Description |
|---|---|
| byte cToken[64] | An encrypted version of the first 64 bits of data (1CDNID, cMajorVersion, cMinorVersion, cOpCode, and cFlags). It is encrypted using a 512 bit (64 byte) private key. Authentication by the CDN preferably is performed by decrypting this field using a public key provided by the Cache and comparing each values to those passed in the structure. If the comparison fails, the request is rejected. |
| byte zippedLog[] | A compressed version of the log data. The log should include the fields as specified in the FullLogFormat field specified during registration. |

Having thus described our invention, what we claim as new and desire to secure by Letters Patent is set forth in the following claims.

What is claimed is:

1. A content delivery method operative in a content delivery network having a set of edge caches located at given network locations, comprising:
   registering a third party cache with a registration server of the content delivery network by transferring given first information from the third party cache to the registration server and by transferring given second information from the registration server to the third party cache;
   wherein the given first information is information selected from: data indicating a public or private status of the third party cache, data identifying Common InterDomain Routing (CIDR) blocks that can be served by the third party cache, block/pass-through IP data, contact data, performance characteristic data, and a cache identifier;
   responsive to given content requests received at the third party cache, serving requested objects from the third party cache; and
   periodically transferring a log from the third party cache to the content delivery network identifying the objects served from the third party cache.

2. The method as described in claim 1 further including the step of parsing the log to identify given content.

3. The method as described in claim 2 further including the step of having the content delivery network bill a content provider for delivery of the given content from the third party cache.

4. The method as described in claim 3 further including the step of sharing revenue between the content delivery network and an owner of the third party cache.

5. The method of claim 1 wherein the given second information is information selected from: a registration time-to-live indication, log delivery frequency data, data indicative of whether the third party cache has received a given number of access requests in a given time period, a location of a network map, content parsing data, and a cache identifier.

* * * * *